Sept. 14, 1948. J. E. CONKLIN 2,449,279
POWER SHOVEL
Filed Nov. 19, 1946

INVENTOR
JOHNIE E. CONKLIN
BY *Joseph B. Gardner*
his atty.

Patented Sept. 14, 1948

2,449,279

UNITED STATES PATENT OFFICE 2,449,279

POWER SHOVEL

Johnie E. Conklin, Oakland, Calif.

Application November 19, 1946, Serial No. 710,836

2 Claims. (Cl. 214—140)

This invention relates to power shovels for excavating or handling earth or similar material.

An object of the invention is to provide an earth-moving boom shovel and hoisting apparatus therefor adapted to be applied as a unit attachment to a conventional haulage tractor or other similar ambulatory vehicle.

Another object of the invention is to provide apparatus of the class described capable of elevating its associated shovel to an exceptional height above the ground but which, in its lowered position, has no portion thereof projecting above the minimum operating headroom of the tractor or other supporting vehicle.

A further object of the invention is to provide a power shovel attachment for tractors or the like which is so compactly arranged in relation to the carrier vehicle that the minimum area of close-quarter maneuverability of the vehicle is not unduly extended.

Still another object of the invention is to provide, in apparatus of the character described, a space-conserving counterweight structure.

Yet another object of the invention is to provide a boom operated shovel apparatus operable in conjunction with a tractor or similar vehicle in which the parts are arranged to produce a minimum of obstruction to the operator's view of the area in which the shovel is working.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing.

Figure 1:
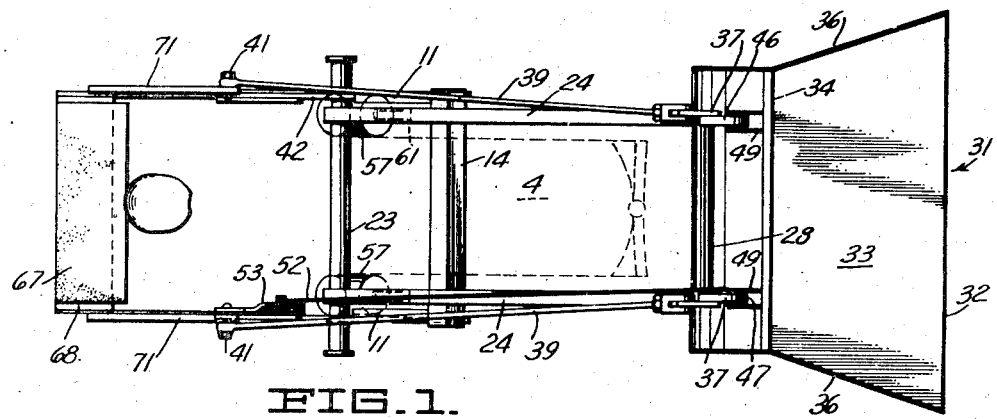
Figure 1 is a top plan view of the power shovel apparatus of my invention showing the application thereof to a conventional track-laying tractor, the latter being indicated in dotted lines.

In the drawing, I have chosen to illustrate the apparatus of my invention in connection with a conventional endless tread-type tractor having an undercarriage 3 on which the power plant 4 and transmission mechanism 6 are incorporated and which carries the running gear comprising the sprockets 7 and track chains 8 powered by drive axles contained in and extending through axle housings 9 projecting from the transmission case. The type of vehicle illustrated constitutes the style with which the apparatus of my invention will be most commonly employed. It is to be understood however that the apparatus may be used as advantageously with other types of wheeled tractors or automotive vehicles without requiring extensive changes in the design of the apparatus or adversely affecting its operating characteristics or efficiency.

In carrying out my invention, I provide a pair of A-shaped side brackets 11 disposed in and rising upwardly out of the spaces between the power plant and transmission mechanism and the inner edge of the track chains. On the rearward portion of each frame 11 I provide a diametrically-split ring clamp 12 arranged to encircle the axle housing 9 and provided with bolts or screws 13 for securing the clamp in place. The forward lower end of each side bracket is provided with means for connection to the tractor undercarriage which in this case comprises a downwardly extending clip 14 having therein an aperture for the reception of a bolt 16 carried by upwardly projecting clips 17 mounted on a cross-member 18 extending between the dolly wheel housings 19 of the undercarriage and secured to the housings 19 by bolts 21 or in any other suitable manner. The side brackets are thus secured in place on the tractor without disturbing or altering any of the existing parts of the latter. Although I have shown types of mounting means which are peculiar to the design of tractor illustrated it will be understood that other forms of mountings may be employed in the event that other types of tractors or vehicles are associated with my apparatus as long as secure anchoring of the frames 11 is afforded.

Figure 2:
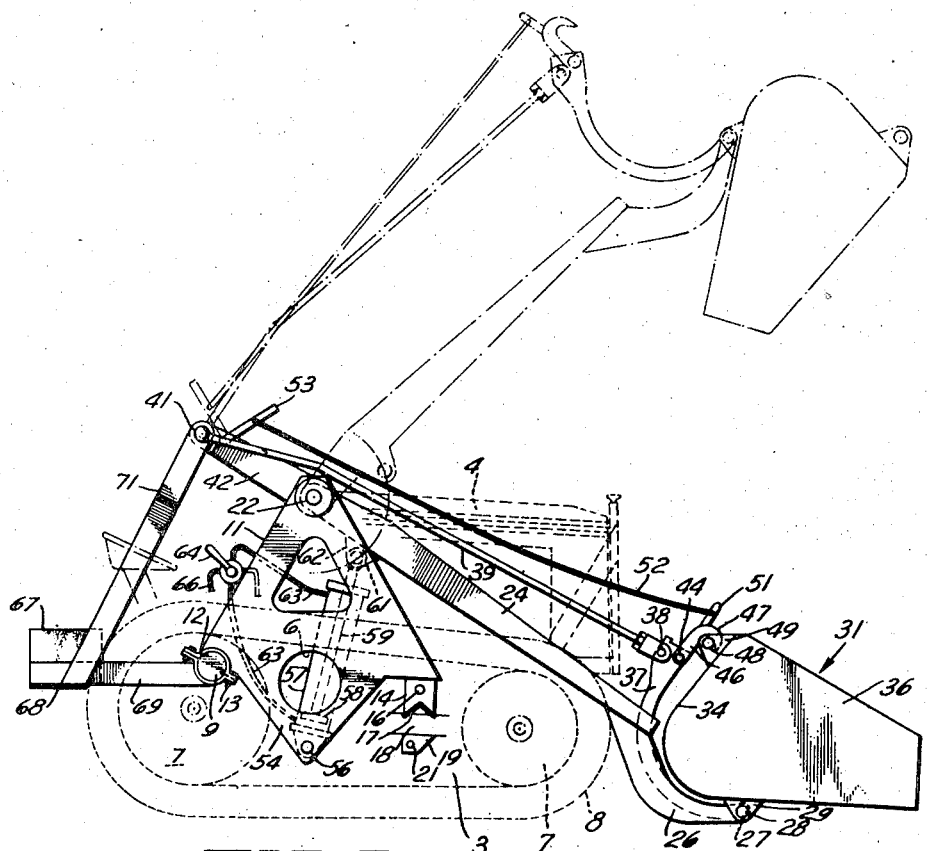
Figure 2 is a side elevational view of the structure shown in Figure 1, the tractor and the elevated position of the shovel being shown, respectively in dot and dash lines.

At the upper end of each side frame 11 I provide a bearing 22 serving as a journal for the end of a pivot shaft 23 lying transversely between the side frames and carrying relatively spaced booms 24 extending toward and slightly beyond the foremost portion of the tractor. To the forward end of each boom of the pair I secure a downwardly and forwardly curving extension arm 26 each of which is provided at its outer or distal end with eye bearings 27 journaling a pivot shaft 28 secured to clips 29 or their equivalent mounted on the bottom of a skip or shovel 31. The shovel 31 is a scoop-shaped member having a horizontal cutting lip 32 extending at least across the full overall width of the tractor and forming the forward edge of a bottom plate 33. The rearward portion of the bottom plate is extended arcuately upwardly to form a back wall 34, and plates 36 forming side walls for the shovel are secured along their marginal edges to the bottom plate and back wall. The arrangement of the parts is such that when the booms 24 are in their fully lowered position, as shown in Figure 2, the bottom plate 33 of the shovel will lie substantially parallel with the surface of the ground.

Means is provided cooperative with the booms 24 forming an elevator carriage for the shovel and means is further provided for maintaining the shovel bottom plate in substantially parallel, or in slightly forwardly and upwardly inclined relation to the ground as the shovel is raised and lowered. Journaled at their lower ends on the pivot shaft 28 and extending arcuately upwardly exteriorly of and along the back wall 34 are cradle members 37 to the upper ends of which are secured, by pivot pins 38, the forward ends of links 39 which extend above and in substantially parallel relation to the booms 24 and are attached by means of pivot pins 41 to fixed arms 42 secured to and extending rearwardly of the side frames 11. The links 39 are so arranged that when the booms 24 are raised or lowered, the former will move correspondingly and will maintain substantial parallelism with the booms so that the cradle members and the shovel supported thereby are retained, throughout the vertical movements and reciprocations of the shovel, with the bottom plate of the shovel in substantial parallelism with the ground. The upper ends of the cradle members 37 are also provided with bores journaling a shaft 44 on which is fixed a pair of latch levers 46 having hooks 47 at their outer ends engaged with pins 48 carried by clips 49 mounted on the exterior back wall 34 of the shovel. An operating lever 51, fixed to and rising from one end of the shaft 44, is provided with a pull cord 52 extending toward and connected with a hand lever 53 pivotally mounted on an arm 42 or to any other portion of the structure conveniently within reach of the operator. The latch levers 46 secure the shovel to the cradle during times when the shovel is being lifted and, as shown by the dotted lines of Figure 2, when the shovel is in an elevated position a tug on the pull cord 52 by manipulating the hand lever 53 will swing the latch levers to release their grip on the pins 48 thereby releasing the shovel and permitting the latter to tilt forwardly and downwardly to dump its load.

Means is provided for forcibly raising or lowering the booms so as to correspondingly reciprocate the shovel from lowered to elevated positions. Formed integrally with and depending from each side frame 11 is a bracket 54 having at its lower end an axially horizontal pivot pin 56 on which the lower end of an hydraulic cylinder 57 is mounted. The piston 58 reciprocably slidable in the cylinder is connected with a piston rod 59 connected by means of a pivot pin 61 to a lug 62 formed integrally with and depending from the bottom of the boom. Communicating with the lower end of the cylinder 57 is a conduit 63 connected with an outlet port of a lever-controlled selector valve 64, mounted within reach of the operator, the conduits 66 of which communicate respectively with the pressure and suction lines of the oil circulating pump of the tractor motor. The internal arrangement of the selector valve is such that when the valve lever is moved to a forward position, oil from the pump will be admitted to the lower end of the cylinder thus forcibly raising the booms and the shovel. Movement of the valve lever to an intermediate position will shut off the oil flow and retain the booms and shovel in said elevated position as long as desired, while moving the lever to a rearward position will allow the oil in the cylinder to flow back into the suction line of the tractor engine oil circulating system thus allowing the booms to descend under the influence of gravity to again bring the shovel into its ground-engaging position. As the dumped shovel will be descending front end downwardly as shown in Figure 2, it will be necessary, after the shovel engages the ground, to reverse the tractor slightly so as to force the shovel to right itself and effect engagement of the latch levers and pins.

When the shovel is in an elevated position, the overhanging load carried thereby plus the weight of the shovel itself will create a considerable overbalancing moment on the tractor and to counteract this I provide at the rear of the tractor a counterweight mass 67 which may be a block of iron or other weighty material carried on a platform 68 or other suitable support connected with arms 69 secured to and extending rearwardly from the ring clamps 12 or from an adjacent portion of the side frames 11. Struts 71 are provided connected to the arms 69 and 42 respectively to support the vertical load of the counterweight 67. The counterweight, being positioned in close relation to the tractor between the treads and below the operator's seat thereof provides a minimum of obstruction to close-quarter maneuvering of the tractor.

It will be noted that the shovel mechanism above described is designed for attachment to a tractor so that as little as possible of the mechanism extends beyond the dimensional limits of the tractor itself so as to permit operation of the apparatus in a much smaller ground area than other devices of this nature are capable of operating in. In addition, the vertical extent of the mechanism is much less than the minimum headroom required even when the operator assumes a stooped position. It is thus possible for a power shovel equipped with the apparatus of my invention to enter and operate in more confined spaces than the average mechanical device of this nature is capable of performing in.

I claim:

1. In a power shovel apparatus for attachment to a conventional track laying tractor including a load-carrying scoop disposed in advance of said tractor and connected to an arm pivotally attached to the tractor and by means of which said scoop may be raised or lowered, an arm supporting frame arranged on said tractor and including attachment means comprising a split-collar surrounding and clamped to the axle housing of the tractor, a rearwardly extending member carried by said split-collar and detachable from the axle having at the rearward end thereof a weight for counterbalancing loads carried by the scoop, and a brace connected at the lower end thereof to said member and connected adjacent the upper end thereof to a support spaced above and substantially paralleling said member, said support being connected with and extending rearwardly from said frame.

2. In a power shovel apparatus for attachment to a conventional track laying tractor including a load-carrying scoop disposed in advance of said tractor and connected to an arm pivotally attached to the tractor and by means of which said scoop may be raised or lowered, an arm supporting frame arranged on said tractor and including attachment means comprising a split-collar surrounding and clamped to the axle housing of the tractor, a member carried by said split-collar and detachable from said axle, said member extending rearwardly from the collar and having at the rearward end thereof a weight for counterbalancing loads carried by the scoop, said weight being positioned at an elevation below the top of said arm supporting frame and positioned with respect to the rearward end of the tractor so as to minimize the increase of overall length of the unit, and a brace connected at the lower end thereof to said member and releasably attached adjacent the upper end thereof to a support spaced above and substantially paralleling said member whereby said weight, member, and brace may be removed as a unit from said frame.

JOHNIE E. CONKLIN.

REFERENCES CITED

The following references are of record in the file of this patent:

UNITED STATES PATENTS

| Number | Name | Date |
| --- | --- | --- |
| 2,304,443 | Butler | Dec. 8, 1942 |
| 2,389,029 | Crabtree | Nov. 13, 1945 |
| 2,391,857 | Arps et al. | Jan. 1, 1946 |
| 2,412,323 | Conrad | Dec. 10, 1946 |
| 2,418,251 | Drott | Apr. 1, 1947 |
| 2,426,544 | Wooldridge | Aug. 26, 1947 |